United States Patent
Ball et al.

[15] 3,656,966
[45] Apr. 18, 1972

[54] FOOD CHIP AND PROCESS FOR MAKING IT

[72] Inventors: Murray E. Ball, Rockford; LeRoy M. Demeny, St. Paul, both of Minn.

[73] Assignee: General Mills, Inc.

[22] Filed: Mar. 25, 1970

[21] Appl. No.: 22,481

Related U.S. Application Data

[63] Continuation-in-part of Ser. No. 680,826, Nov. 6, 1967, abandoned.

[52] U.S. Cl. ............................................. 99/83, 99/81
[51] Int. Cl. ................................... A23l 1/10, A23l 1/18
[58] Field of Search ............................... 99/83, 81, 80

[56] References Cited

UNITED STATES PATENTS

| | | | |
|---|---|---|---|
| 1,945,947 | 2/1934 | McKay | 99/81 |
| 3,062,657 | 11/1962 | Vollink | 99/80 |
| 3,114,639 | 12/1963 | Rivoche | 99/80 X |
| 3,150,978 | 9/1964 | Campfield | 99/80 X |
| 3,332,781 | 7/1967 | Benson et al. | 99/81 |

Primary Examiner—Raymond N. Jones
Assistant Examiner—James R. Hoffman
Attorney—Anthony A. Juettner and L. Me Roy Lillehaugen

[57] ABSTRACT

A process for making a ready-to-eat food chip from cereal grain such as wheat or rye, by cooking a mixture of whole wheat, or whole rye, which has been cut into pieces, water, flavoring ingredients, and a small amount of another grain such as rice if desired, thereby forming a dough, shaping the dough into pieces or chips, drying the pieces, expanding or puffing the pieces by deep fat frying them in oil, and dusting the resulting chips with salt.

11 Claims, 5 Drawing Figures

PATENTED APR 18 1972　　　　　　　　　　　　　3,656,966

INVENTORS
MURRAY E. BALL
LEROY M. DEMENY
BY
ATTORNEY

FOOD CHIP AND PROCESS FOR MAKING IT

This is a continuation-in-part of application Ser. No. 680,826, filed on Nov. 6, 1967 now abandoned.

The present invention relates to a process for making a food product, and the resulting product. More specifically, it pertains to the preparation of a ready-to-eat food chip which includes wheat or rye as its major ingredient.

Numerous apparatus and processes have been devised for forming a variety of edible snack food products from starch containing ingredients such as cereal grains and vegetables. Such products have been formed in a number of different shapes and sizes in order to effect and improve their physical characteristics, their taste and texture, their convenience of use, as well as their marketability. A popular form of snack product is provided in chip form, as exemplified by the potato chip. Efforts have been made from time to time to form chip products from other ingredients as well, such as corn. To the best of applicants' knowledge, efforts to form an edible chip from wheat or rye have not been successful; the resulting product has lacked the desirable flavor, texture, and appearance characteristics necessary to warrant its production and subsequent marketing.

Accordingly, one object of the present invention is to provide a novel process for making an edible food product.

Another object is to provide a process for forming an improved edible food snack having wheat as its major ingredient.

Another object is to provide a process for forming an improved edible food snack having rye as its major ingredient.

A further object is to provide an improved process for making a wheat chip or a rye chip having excellent flavor, texture, and appearance characteristics.

A still further object is to provide an improved edible wheat containing chip.

Another object is to provide an improved edible rye containing chip.

Other objects and advantages will become apparent from a consideration of the following specification and accompanying drawings.

Generally, the invention involves cutting kernels of cereal grain, such as whole wheat or whole rye, into slices or pieces, and combining the pieces with a small amount of rice or other grain if desired, which has likewise been reduced in size. The cereal grains are combined and mixed with water and flavoring ingredients, and formed into a dough or mass by pressure cooking the mixture. The dough is cooled if desired, formed into pieces having a prescribed size and shape and dried to a prescribed moisture content. The pieces are thereafter deep fat fried in oil and salted to form the final chip.

The invention will be better understood by reference to the following drawings wherein.

Figure 1:
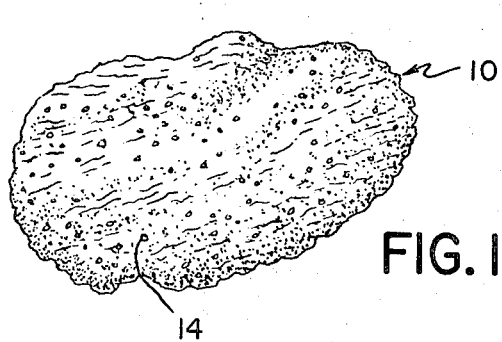
FIG. 1 is a perspective view of a snack chip formed according to the present invention.

Since the product formed in accordance with the present invention is comprised primarily of wheat or rye as the cereal base, one of the first factors to be considered is the type of wheat or rye to be used. When wheat is used, it has been found that either soft or hard wheat can be used with satisfactory results. When rye is used, whole, clean, dry rye should preferably be used. Another factor to be considered is whether a certain amount of another cereal grain should be included in the formulation. It has been discovered that inclusion of a certain amount of rice in either the wheat product formulation or the rye product formulation, results in a product having a different texture because the resulting product seems to puff or expand better, it has a different appearance because it is somewhat bubbly or irregular, and it changes the flavor and palatability characteristics of the product. Generally, the ratio of wheat or rye to rice should range from about 1–5 parts of wheat or rye to about 1 part of rice. More specifically, when wheat and rice are combined, preferably about 5 parts of wheat to about 1 part of rice are used; when rye and rice are combined on the other hand, preferably about 3 parts of rye to about 1 part of rice are used. In addition, in some instances, it might be preferred to use a combination of other cereal grains such as rye and barley, in varying ranges of each. Moreover, it might be desirable to combine wheat and rye in varying amounts with each other, to form a product having somewhat different features and characteristics.

The first step in preparing the product after selecting the wheat or rye to be used, is to subject the individual kernels to a cutting operation so as to reduce their size, to increase the total surface area, and to expose the endosperm, thereby improving the absorption of moisture capabilities of the kernels when they are combined with water. As known, the outer layer, or bran, of a kernel such as wheat or rye, is quite tough and relatively difficult to penetrate with water; cutting the kernels into pieces or slices improves the overall process. Cutting devices are known in the art and are commercially available for slicing the kernels into a plurality of slices or pieces having a thickness ranging from about 0.030–0.055 inch. Urschel Laboratories, Inc., Valparaiso, Indiana, for example, manufactures cutting devices which have been used with satisfactory results. For optimum results, it is preferred that a minimum amount of fine particles (i.e., flour-sized particles) be obtained during the cutting operation. The rice kernels are likewise subjected to a cutting or comminuting operation; in this instance, the kernels can be reduced to a relatively small particle size by using one of various well known and commercially available reduction mills, such as Fitzpatrick Mills, Raymond Vertical Mills, or the like. In certain instances it might be preferred to use broken kernels of rice, rather that subjecting whole kernels to a cutting or comminuting operation. As known to those familiar with the art, such a product is ofttimes referred to as "second heads."

After the individual kernels have been reduced in size, a mixture is formed by combining a predetermined amount of the cut wheat or rye kernels with a prescribed amount of the rice, flavoring ingredients such as sugar, salt, bicarbonate of soda, and malt flavoring, and enough water to raise the moisture content of the mixture to about 25–40 percent, and preferably about 30 percent. In this regard additional flavoring ingredients, such as onion flavoring, might be used to impart a specific flavor to the product. Moreover, if desired, one or more artificial colorants might be included so as to give the product a certain hue. Generally, a good chip can be formed by using about 45–80 parts of the cut wheat or rye kernels, about 0–25 parts ground rice, about 15–30 parts water, about 0–10 parts sugar, about 0–4 parts malt syrup, about 0–5 parts salt, and about 0–1 part sodium bicarbonate. The resulting mixture is then permitted to steep at room temperature for about one hour, during which time the moisture soaks into the cut pieces, and the flavoring ingredients penetrate the pieces. Furthermore, the tempering, while not essential, shortens the subsequent cooking time required.

After the mixture has been tempered, the ingredients are cooked in a pressure cooker until the starch is gelatinized. It is preferred that the cooking be accomplished without completely mashing or crushing the cut wheat or rye pieces; in other words, the resulting dough should retain discrete particles of the wheat or rye bran after the cooking operation has been completed. The pressure cooking can be accomplished in a batch cooker, or if desired a continuous type pressure cooker might be used. Both types of cookers are well known in the art and will not be described in detail. In both types of cookers, the relative conditions of time, temperature, and pressure can be controlled depending upon the type of product being cooked, the amount of gelatinization desired, and the like.

Generally, it has been found that the ingredients should be cooked for about one hour at a pressure of about 20 psig., although the pressure might vary within a range from about 15–30 psig.; and at a temperature which ranges from about 250°–280° F., depending upon the pressure used. Cooking pressures above or below the above range might also be used, but in a commercial operation there is no particular advantage in using a higher pressure, and lower pressures might result in inadequate cooking.

The cooked mass or dough is discharged from the cooker having a temperature of about 250° F. or higher. At such temperatures, the dough is relatively sticky and often difficult to handle; therefore, it has been found advisable to cool the dough before it is processed further. For best results, the dough should be cooled to a temperature below about 140° F. and preferably to a range of about 100°–120° F. Adequate cooling can be achieved by spreading the dough over a surface and permitting the dough to cool at room temperature for a desired period of time, e.g., 15–30 minutes, or by blowing cool air over or through the dough. In some instances, it might be desirable or necessary to de-lump, or break down, the dough in a hammer mill after it has been cooled. It should be recognized of course, that in some instances it might not be necessary or desirable to cool the dough.

After cooling, the cooked dough which is quite pliable, is formed into chips. This operation can be performed by rolling or extruding the mass into a sheet or sheets, having a thickness ranging from about 0.020 to 0.060 inch. The relative thickness of the sheet can vary depending upon the type of ingredients used, the type of rolls used, e.g., whether smooth or corrugated or a combination thereof, and the like. The sheet is then cut and formed into chips having a prescribed shape. Another shaping technique might involve extruding the dough into a rope which is cut into pellets, which are then flaked between rolls to form chips or flakes having a prescribed thickness. Generally, it has been found that if the chips are too thin, the resulting product is quite fragile and easily broken; on the other hand, if the chip is too thick, it will not cook properly during the frying operation. The chips thus formed, have a moisture level ranging from about 18–35 percent, and preferably the moisture level should be about 28 percent.

After the dough is formed into pieces or chips, the chips are dried in order to reduce their moisture content to about 8–14 percent, preferably about 11 percent. It has been found that if the chips are either too moist or too dry, they will not puff properly when subsequently subjected to intense heating. Various drying procedures and techniques might be employed. A suitable product can be obtained by drying at room temperature for a prescribed period of time; if time is important however, the pieces can be dried at an elevated temperature, e.g., 100° F. by appropriate means. It has been found that if the chips are dried by using too high a temperature, e.g., 200° F., they do not puff as well when subsequently subjected to intense heat.

After the chips have been dried, they are puffed or expanded by subjecting them to intense heat for a short period of time. Although a number of methods might satisfactorily be used, such as salt puffing, it is preferred that the chip be deep fat fried in oil having a temperature ranging from about 350°–400° F. for about 5–40 seconds. This step normally reduces the moisture content of the chips to about 0.2–3.0 percent, and causes the product to increase somewhat in size. The product is then removed from the fryer, dusted with salt so that about 0.5 to 3.0 percent by weight of salt is added, and the product allowed to cool. The oil content of the final product might range from about 25–40 percent, and preferably about 30 percent. After cooling, the product is either packaged immediately, or stored for future packaging.

Figure 3:
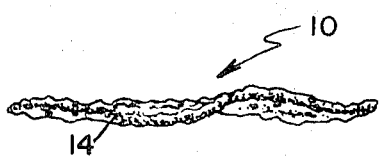
FIG. 3 is a side elevational view of the chip.
Figure 2:
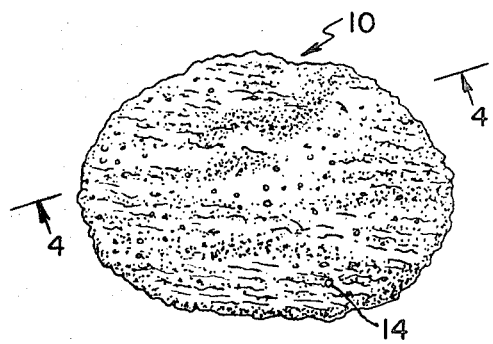
FIG. 2 is a top plan view of the chip illustrated in FIG. 1.
Figure 4:
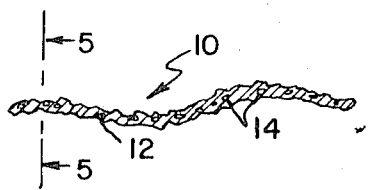
FIG. 4 is an enlarged sectional view taken along line 4—4 of FIG. 2.
Figure 5:
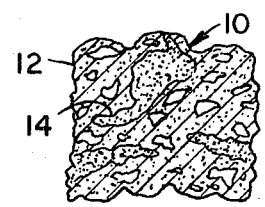
FIG. 5 is an enlarged partial view taken along line 5—5 of FIG. 4.

FIGS. 1–5 illustrate a chip 10 formed in accordance with the present invention. In general, the appearance of such a chip is substantially the same when either wheat or rye is used as the cereal grain; generally, the rye chip will have a darker color however. For purposes of illustration, the chip 10 will be described as being comprised of wheat and rice. As illustrated, the chip 10 has a somewhat uneven outline and a bubbly, irregular surface. As shown more fully in FIG. 4, the chip 10 includes an expanded starch matrix or structure 12 formed from the cooked gelatinized rice, a certain amount of the cooked wheat, the water, and the flavoring ingredients. Pieces of the cut wheat kernels or bran, are shown at 14. Chips of this type, whether formed from wheat or rye, have a unique texture because they contain discrete pieces of bran separated from each other by the gelatinized starch; moreover, the chips have a flavorful and delectable taste which is quite different from food products presently known.

The invention will be better understood by reference to the following examples:

EXAMPLE I

One hundred pounds of soft white wheat having a moisture content of about 12% were fed into a cutting apparatus, manufactured by Urschel Laboratories, Inc., so that the kernels were cut into a plurality of slices or pieces having a thickness of about 0.040 inch; less than 10 percent fines were produced which passed through a 20-mesh screen. About 11,300 grams of the cut wheat were combined and mixed with about 3,600 milliliters of water, 300 grams of salt, 225 grams of malt syrup, and about 60 grams of sodium bicarbonate. The resulting mixture was permitted to stand at room temperature for about 60 minutes, thus permitting the cut pieces to absorb at least part of the water, and permitting the flavoring ingredients to penetrate into the cut pieces. A dough having a moisture content of about 30 percent was then prepared by pressure cooking the mixture for about 1 hour at 20 psig. After cooking, the dough was cooled at room temperature until its temperature was lowered to about 120° F. The dough was then formed into a sheet about 0.032–0.035 inch thick by running it through a pair of sheeting rolls, and cut into chips about 1–2 inches in diameter. The chips were air dried at room temperature for 24 hours to a moisture content of about 11 percent. The dried chips were then deep fat fried in coconut oil having a temperature of 375° F. for about 15 seconds. The chips expanded in thickness, as well as in diameter during the frying step; their moisture content was reduced to about 1.5 percent; and their oil content was about 35 percent. The chips were then dusted with salt so that an additional 1 percent by weight was added. The resulting chips were considered very good.

EXAMPLE II

Twenty-five pounds of white rice having a moisture content of about 11 percent were milled in a Fitz Mill operated at medium speed and using a No. 5 screen. One thousand eight hundred grams of the milled rice were combined and mixed with about 9,500 grams of the cut wheat formed in Example I, 3,600 milliliters of water, 225 grams of salt, 225 grams of malt syrup, and about 70 grams of sodium bicarbonate. This mixture was permitted to steep for about 1 hour, after which a dough was formed by pressure cooking the mixture for about 1 hour at 20 psig. After cooking, the dough was tempered by blowing cool air over the mass, and then sheeted to a thickness of about 0.035 inch. Chips which were cut from the sheet were dried to a moisture content of about 10 percent, deep fat fried in coconut oil for 10 seconds at a temperature of 375° F., and dusted with salt. The resulting chips had a crispy, crunchy texture, an appetizing appearance, and a delicious flavor.

EXAMPLE III

A mixture was formed by combining and mixing about 7,700 grams of cut wheat with about 3,600 grams of ground rice, 3,600 milliliters of water, 300 grams of salt, 225 grams of malt syrup, and about 70 grams soda; thus the ratio of wheat to rice was a little over 2:1, rather than about 5:1, as set forth in Example II. The mixture was steeped for about 1 hour, and cooked in a pressure cooker for 1 hour at 20 psig. to form a dough. The dough was immediately formed into a rope by extruding it through a die opening in a piston-type extruder. The rope was formed into pellets having a diameter of about five-sixteenths inch, and a length of about three-fourths of an inch. The pellets were then flaked or flattened by passing them through a set of shred rolls to a thickness ranging from about 0.025–0.030 inch. After drying to a moisture content of about 9.5 percent, the chips were deep fat fried in coconut oil at 375° F. for about 10 seconds, and dusted with salt. The final product had an oil content of about 28 percent, and a good flavor.

EXAMPLE IV

A mixture was formed by combining 9,070 grams of cut wheat with about 2,175 milliliters of water, and permitting it to temper for about 1 hour at room temperature. A dough was formed by pressure cooking the mixture for about 1 hour at 20 psig. The cooked dough was cooled, sheeted between a pair of corrugated rollers to a thickness of about 0.046–0.048 inch, and cut into chips. The chips were dried to a moisture level of about 11 percent, after which they were deep fat fried in coconut oil for about 27 seconds at 390° F; the moisture content of such fried chips being reduced to about 1 percent after frying. After frying, the chips were dusted with salt so that about 2 percent by weight was applied. While the cooked dough was comprised only of cut wheat and water, it nevertheless resulted in a wheat chip, which when dusted with salt, had very favorable characteristics as to flavor, texture, and appearance.

EXAMPLE V

One hundred pounds of whole, clean rye having a moisture content of about 12.5 percent were fed into the cutting apparatus identified in Example I, so that the individual rye kernels were cut into slices about 0.040 inch thick. About 9,000 grams of the cut rye were combined and mixed with about 2,400 milliliters of water, 450 grams of sugar, and 90 grams of salt. This mixture was tempered for about 1 hour at room temperature, after which a dough was formed by pressure cooking the ingredients for about 1 hour at 20 psig. The resulting dough was cooled, formed into a sheet about 0.052 inch thick, and cut into chips. The chips were then air dried to a moisture content of about 11.0 percent, deep fat fried in coconut oil for about 12 seconds at 400° F; and then dusted with salt. The resulting product, while similar to the wheat chip product formed in Example I, had a somewhat more pronounced and distinguished flavor and its color was somewhat darker; in most respects however, it compared favorably to the wheat chip.

EXAMPLE VI

A mixture containing about 6,800 grams of the cut rye formed in Example V, 2,270 grams of broken kernels of white rice, referred to as "second heads," 450 grams of sucrose and 90 grams of salt, were combined with about 2,270 milliliters of water, and permitted to steep for about 1 hour. A dough was formed by pressure cooking the ingredients for about 1 hour at 20 psig, after which the dough was cooled, sheeted to a thickness of about 0.052 inch, cut into chips, and dried to a moisture content of about 11 percent. The dried chips were then deep fat fried in coconut oil at 400° F. for about 12 seconds, and dusted with salt.

EXAMPLE VII

The general procedure set forth in Example V was followed by permitting a mixture of 9,070 grams of cut rye kernels and about 2,040 milliliters of water to temper for about 1 hour. After cooking, the resulting dough was cooled, sheeted to a thickness of about 0.052 inch, cut into chips, dried, deep fat fried for about 12 seconds at 400° F., and dusted with salt so that about 2 percent by weight was applied. The rye chip which resulted compared favorably to the chip formed in Examples V and VI.

The products formed in accordance with the present invention result in a chip which is quite different from the conventional chip-type products presently available on the market. Not only do the chips exhibit a flavor substantially different from known products, but they also have a texture and appearance which is not the same as existing products. As illustrated in the drawings and as described in the examples, the resulting chip contains a plurality of discrete pieces or particles which give the product uniquely different flavor, texture, and appearance characteristics.

In the above description, a disclosure of the principles of this invention is presented, together with some of the specific examples by which the invention might be carried out.

Now therefore, we claim:

1. A process for making a ready-to-eat food product which comprises subjecting individual kernels of grain selected from the group consisting of whole wheat and whole rye, and mixtures thereof, to a slicing operation to reduce their size and expose the endosperm, forming a mixture by combining the sliced grain kernels with flavoring ingredients and enough water to raise the moisture content of the mixture to about 25–40 percent, pressure cooking said mixture to gelatinize the starch contained in the kernels and form a dough having discrete particles of bran retained in the dough, forming the dough into pieces having a prescribed size and shape, drying said pieces to a moisture content of about 8–14 percent, and puffing and expanding said pieces by subjecting them to intense heat for a prescribed period of time, said puffed pieces having discrete particles of bran retained therein which are separated from each other by the gelatinized starch.

2. The process of claim 1 which includes combining rice kernels which have been reduced in size with said mixture, the ratio of sliced grain kernels to rice ranging from about 1–5 parts of said grain kernels to one part of rice.

3. The process of claim 1 wherein the grain kernels are sliced so that less than 10 percent fines are formed which pass through a 20-mesh screen.

4. The process of claim 1 which includes steeping the mixture for about one hour at room temperature before the mixture is introduced into the cooker.

5. The process of claim 4 which includes cooling the dough to a temperature below 140° F. after it is discharged from the cooker and before it is formed into pieces.

6. The process of claim 5 which includes forming the dough into sheets after the dough has been cooled, said sheets having a thickness ranging from about 0.025 to 0.060 inch, and cutting the sheets into chips having a prescribed size and shape.

7. The process of claim 1 wherein the pieces are puffed by deep fat frying them in oil at about 350°–400° F. for about 10–40 seconds thereby reducing their moisture content to about 0.2–3.0 percent.

8. The process of claim 7 which includes dusting the fried pieces with salt so that about 0.5–3.0 percent by weight of salt is added, the oil content of said pieces ranging from about 25–40 percent.

9. A process for making a ready-to-eat wheat chip which comprises slicing individual kernels of whole wheat into slices having a thickness ranging from about 0.030–0.055 inch to reduce their size and expose the endosperm, milling kernels of rice into flour, combining about 1–5 parts of said sliced wheat and about 1 part of said rice with water, sodium bicarbonate, salt, and malt syrup, thereby forming a mixture, steeping said mixture for about 1 hour, pressure cooking said mixture to gelatinize the starch contained in the kernels and form a dough having a moisture content of about 25–40 percent and discrete particles of bran in the dough, cooling said dough to a temperature ranging from about 100°–120° F., forming said dough into a sheet about 0.020–0.060 inch thick, cutting said sheet into chips, drying said chips to a moisture level of about 8–14 percent, deep fat frying said chips in oil at 350°–400° F. for 10–40 seconds, and applying salt to the chips after frying so that about 1–3 percent by weight is applied to said chips, said chips having discrete particles of bran retained therein which are separated from each other by the gelatinized starch.

10. A process for making a ready-to-eat rye chip which comprises slicing individual kernels of whole rye into slices having a thickness ranging from about 0.030–0.055 inch, to reduce their size and expose the endosperm, combining about 1–3 parts of said sliced rye with about 1 part of rice kernels which have been reduced in size, water, sugar, and salt, thereby forming a mixture, steeping said mixture for about one hour, pressure cooking said mixture to gelatinize the starch and form a dough having a moisture content of about 25–40 percent and discrete particles of bran in the dough, cooling said dough to a temperature ranging from about 100°–120° F., forming said dough into a sheet about 0.020–0.060 inch thick, cutting said sheet into chips, drying said chips to a moisture level of about 8–14 percent, deep fat frying said chips in oil at 350°–400° F. for 5–40 seconds, and applying salt to the chips after frying so that about 1–3 percent by weight is applied to said chips, said chips having discrete particles of bran retained therein which are separated from each other by the gelatinized starch.

11. A ready to eat food product made by the process of claim 1.

* * * * *